(12) United States Patent
Liu et al.

(10) Patent No.: US 11,328,429 B2
(45) Date of Patent: May 10, 2022

(54) METHOD AND APPARATUS FOR DETECTING GROUND POINT CLOUD POINTS

(71) Applicant: Apollo Intelligent Driving Technology (Beijing) Co., Ltd., Beijing (CN)

(72) Inventors: Xiang Liu, Beijing (CN); Shuang Zhang, Beijing (CN); Bin Gao, Beijing (CN); Xiaoxing Zhu, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 51 days.

(21) Appl. No.: 16/807,936

(22) Filed: Mar. 3, 2020

(65) Prior Publication Data

US 2021/0090263 A1 Mar. 25, 2021

(30) Foreign Application Priority Data

Sep. 24, 2019 (CN) .......................... 201910903363.9

(51) Int. Cl.
*G06T 7/13* (2017.01)
*G06T 7/136* (2017.01)

(52) U.S. Cl.
CPC ............... *G06T 7/13* (2017.01); *G06T 7/136* (2017.01); *G06T 2207/10028* (2013.01); *G06T 2207/30261* (2013.01)

(58) Field of Classification Search
CPC ............. G06T 7/13; G06T 2207/10028; G06T 2207/30261; B60G 2800/965
See application file for complete search history.

(56) References Cited

U.S. PATENT DOCUMENTS

2013/0096886 A1\* 4/2013 Vorobyov .............. G01C 11/00
703/1
2013/0218472 A1\* 8/2013 Fu ............................. G06T 7/11
702/5

(Continued)

FOREIGN PATENT DOCUMENTS

CN 108427124 A 8/2018
CN 108732586 A 11/2018

(Continued)

OTHER PUBLICATIONS

Japanese Notice of Allowance for Japanese Application No. 2020-036468, dated Sep. 30, 2021, 3 pages.

*Primary Examiner* — Oneal R Mistry
*Assistant Examiner* — Nicolas James Boyajian
(74) *Attorney, Agent, or Firm* — Seed IP Law Group LLP

(57) ABSTRACT

Embodiments of the present disclosure relate to a method and apparatus for detecting ground point cloud points. The method may include: determining a segmentation plane and a ground based on a point cloud collected by a lidar; segmenting the point cloud into a first sub point cloud and a second sub point cloud based on the segmentation plane; and determining the point cloud points whose distances from the ground are smaller than a first distance threshold in the first sub point cloud as ground point cloud points, and determining the point cloud points whose distances from the ground are smaller than a second distance threshold in the second sub point cloud as the ground point cloud points, where the first distance threshold is smaller than the second distance threshold.

20 Claims, 4 Drawing Sheets

(56) References Cited

U.S. PATENT DOCUMENTS

| | | | | |
|---|---|---|---|---|
| 2017/0191826 A1* | 7/2017 | Nagori | ................... | G06T 7/77 |
| 2018/0074203 A1* | 3/2018 | Zermas | ............. | G06K 9/00805 |
| 2018/0330514 A1* | 11/2018 | Kosoy | ................ | G06T 7/344 |
| 2019/0005667 A1* | 1/2019 | Khawaja | ............... | G06T 7/536 |
| 2019/0156507 A1* | 5/2019 | Zeng | ..................... | G06T 7/70 |

FOREIGN PATENT DOCUMENTS

| | | |
|---|---|---|
| CN | 108917761 A | 11/2018 |
| CN | 109766404 A | 5/2019 |
| JP | 2011-233165 A | 11/2011 |
| JP | 2012-221456 A | 11/2012 |
| JP | 2015-114261 A | 6/2015 |
| JP | 2018-534647 A | 11/2018 |

\* cited by examiner

METHOD AND APPARATUS FOR DETECTING GROUND POINT CLOUD POINTS

CROSS-REFERENCE TO RELATED APPLICATIONS

This application claims priority to Chinese Application No. 201910903363.9, filed on Sep. 24, 2019 and entitled "Method and Apparatus for Detecting Ground Point Cloud Points," the entire disclosure of which is hereby incorporated by reference.

TECHNICAL FIELD

Embodiments of the present disclosure relate to the field of computer technology, and specifically to a method and apparatus for detecting ground point cloud points.

BACKGROUND

An autonomous vehicle is a novel intelligent vehicle, also known as a "wheeled mobile robot". The vehicle mainly acquires data from its surrounding environment through a sensor (a lidar, a camera, or the like), and gives an instruction after comprehensive analysis and operation on the data to control different devices in the autonomous vehicle respectively, thereby realizing full-automatic operation of the vehicle, and achieving the purpose of autonomous driving of the vehicle.

However, when detecting obstacles from a point cloud collected by the lidar, the ground is easily detected as an obstacle by mistake. In order to reduce the false detection rate of obstacles, ground point cloud points in the point cloud are usually detected first, then the ground point cloud points are filtered from the point cloud, and the detection of obstacles is finally performed based on the filtered point cloud.

At present, the conventional method for detecting ground point cloud points is to first draw a distribution histogram of a point cloud by taking the height interval as the horizontal ordinate and the number of point cloud points as the longitudinal coordinate, and then determine the point cloud points falling into a peak interval of the distribution histogram in the point cloud as the ground point cloud points.

SUMMARY

Embodiments of the present disclosure propose a method and apparatus for detecting ground point cloud points.

In a first aspect, an embodiment of the present disclosure provides a method for detecting ground point cloud points, including: determining a segmentation plane and a ground based on a point cloud collected by a lidar; segmenting the point cloud into a first sub point cloud and a second sub point cloud based on the segmentation plane, distances between point cloud points of the first sub point cloud and the lidar being shorter than a distance between the segmentation plane and the lidar, and distances between point cloud points of the second sub point cloud and the lidar being not shorter than the distance between the segmentation plane and the lidar; and determining the point cloud points whose distances from the ground are smaller than a first distance threshold in the first sub point cloud as ground point cloud points, and determining the point cloud points whose distances from the ground are smaller than a second distance threshold in the second sub point cloud as the ground point cloud points, the first distance threshold being smaller than the second distance threshold.

In some embodiments, the determining a segmentation plane and a ground based on a point cloud collected by a lidar includes: determining a density of point cloud points in the point cloud; generating a corresponding relationship between the density of point cloud points in the point cloud and a distance of the point cloud from the lidar; and querying the corresponding relationship based on a preset segmentation density to obtain the segmentation plane.

In some embodiments, the determining the density of point cloud points in the point cloud includes: calculating, for the point cloud points of the same beam in the point cloud, a distance between adjacent point cloud points; and determining the density of point cloud points of the beam based on the distance between the adjacent point cloud points.

In some embodiments, the determining the density of point cloud points in the point cloud includes: calculating, in response to determining that the point cloud includes point cloud points of at least two beams, a distance between point cloud points of adjacent beams in the point cloud; and determining the density of point cloud points of the adjacent beams based on the distance between the point cloud points of the adjacent beams.

In some embodiments, the determining a segmentation plane and a ground based on a point cloud collected by a lidar includes: drawing a distribution histogram of the point cloud by taking a height interval as a horizontal ordinate and a number of point cloud points as a longitudinal coordinate; and fitting the ground based on the point cloud points falling into a peak interval of the distribution histogram.

In some embodiments, the determining a segmentation plane and a ground based on a point cloud collected by a lidar includes: selecting an estimated ground point cloud from the point cloud; dividing a first three-dimensional space where the estimated ground point cloud is located into a plurality of second three-dimensional spaces; performing ground estimation on estimated ground point cloud points within the plurality of second three-dimensional spaces to obtain a plurality of ground sub planes; and generating the ground based on the plurality of ground sub planes.

In some embodiments, the performing ground estimation on estimated ground point cloud points within the plurality of second three-dimensional spaces to obtain a plurality of ground sub planes includes: fitting a plurality of first planes based on the estimated ground point cloud points within the plurality of second three-dimensional spaces; and performing following fitting steps for each first plane: selecting estimated ground point cloud points whose distances from the first plane are smaller than the first distance threshold from the second three-dimensional space where the first plane is located, as candidate ground point cloud points; fitting a second plane by using the candidate ground point cloud points; determining whether the second plane is stable; and using the second plane as the ground sub plane in response to determining that the second plane is stable.

In some embodiments, the performing ground estimation on estimated ground point cloud points within the plurality of second three-dimensional spaces to obtain a plurality of ground sub planes further includes: replacing, in response to determining that the second plane is unstable, the first plane with the second plane, and continuing to perform the fitting steps.

In some embodiments, the determining whether the second plane is stable includes: determining, in response to determining that a number of performing the fitting steps is smaller than a number threshold, whether a sum of distances from the estimated ground point cloud points within the second three-dimensional space to the second plane is smaller than the second distance threshold; determining, in response to determining that the sum of the distances from the estimated ground point cloud points within the second three-dimensional space to the second plane is smaller than the second distance threshold, that the second plane is stable; and determining, in response to determining that the sum of the distances from the estimated ground point cloud points within the second three-dimensional space to the second plane is not smaller than the second distance threshold, that the second plane is unstable.

In some embodiments, the generating the ground based on the plurality of ground sub planes includes: calculating, for each ground sub plane, a weighted average of an angle of the ground sub plane and an angle of an adjacent ground sub plane; and adjusting the angle of the ground sub plane based on the weighted average.

In a second aspect, an embodiment of the present disclosure provides an apparatus for detecting ground point cloud points, the apparatus including: a first determining unit, configured to determine a segmentation plane and a ground based on a point cloud collected by a lidar; a segmenting unit, configured to segment the point cloud into a first sub point cloud and a second sub point cloud based on the segmentation plane, distances between point cloud points of the first sub point cloud and the lidar being shorter than a distance between the segmentation plane and the lidar, and distances between point cloud points of the second sub point cloud and the lidar being not shorter than the distance between the segmentation plane and the lidar; and a second determining unit, configured to determine the point cloud points whose distances from the ground are smaller than a first distance threshold in the first sub point cloud as ground point cloud points, and determine the point cloud points whose distances from the ground are smaller than a second distance threshold in the second sub point cloud as the ground point cloud points, the first distance threshold being smaller than the second distance threshold.

In some embodiments, the first determining unit includes: a determining subunit, configured to determine a density of point cloud points in the point cloud; a first generating subunit, configured to generate a corresponding relationship between the density of point cloud points in the point cloud and a distance of the point cloud from the lidar; and a query subunit, configured to query the corresponding relationship based on a preset segmentation density to obtain the segmentation plane.

In some embodiments, the determining subunit is further configured to: calculate, for the point cloud points of the same beam in the point cloud, a distance between adjacent point cloud points; and determine the density of point cloud points of the beam based on the distance between the adjacent point cloud points.

In some embodiments, the determining subunit is further configured to: calculate, in response to determining that the point cloud includes point cloud points of at least two beams, a distance between point cloud points of adjacent beams in the point cloud; and determine the density of point cloud points of the adjacent beams based on the distance between the point cloud points of the adjacent beams.

In some embodiments, the first determining unit includes: a drawing subunit, configured to draw a distribution histogram of the point cloud by taking a height interval as a horizontal ordinate and a number of point cloud points as a longitudinal coordinate; and a fitting subunit, configured to fit the ground based on the point cloud points falling into a peak interval of the distribution histogram.

In some embodiments, the first determining unit includes: a selecting a subunit, configured to select an estimated ground point cloud from the point cloud; a dividing subunit, configured to divide a first three-dimensional space where the estimated ground point cloud is located into a plurality of second three-dimensional spaces; an estimating subunit, configured to perform ground estimation on estimated ground point cloud points within the plurality of second three-dimensional spaces to obtain a plurality of ground sub planes; and a second generation subunit, configured to generate the ground based on the plurality of ground sub planes.

In some embodiments, the estimating subunit includes: a first fitting module, configured to fit a plurality of first planes based on the estimated ground point cloud points within the plurality of second three-dimensional spaces; and a second fitting module, configured to perform following fitting steps for each first plane: selecting estimated ground point cloud points whose distances from the first plane are smaller than the first distance threshold from the second three-dimensional space where the first plane is located, as candidate ground point cloud points; fitting a second plane by using the candidate ground point cloud points; determining whether the second plane is stable; and using the second plane as the ground sub plane in response to determining that the second plane is stable.

In some embodiments, the estimating subunit further includes: a replacing module, configured to replace, in response to determining that the second plane is unstable, the first plane with the second plane, and continue to perform the fitting steps.

In some embodiments, the second fitting subunit is further configured to: determine, in response to determining that a number of performing the fitting steps is smaller than a number threshold, whether a sum of distances from the estimated ground point cloud points within the second three-dimensional space to the second plane is smaller than the second distance threshold; determine, in response to determining that the sum of the distances from the estimated ground point cloud points within the second three-dimensional space to the second plane is smaller than the second distance threshold, that the second plane is stable; and determine, in response to determining that the sum of the distances from the estimated ground point cloud points within the second three-dimensional space to the second plane is not smaller than the second distance threshold, that the second plane is unstable.

In some embodiments, the second generating subunit is further configured to: calculate, for each ground sub plane, a weighted average of an angle of the ground sub plane and an angle of an adjacent ground sub plane; and adjust the angle of the ground sub plane based on the weighted average.

In a third aspect, an embodiment of the present disclosure provides an electronic device, the electronic device including: one or more processors; and a storage apparatus, storing one or more programs, where the one or more programs, when executed by the one or more processors, cause the one or more processors to implement any implementation of the method according to the first aspect.

In a fourth aspect, an embodiment of the present disclosure provides a computer readable medium, storing a computer program thereon, where the computer program, when executed by a processor, implements any implementation of the method according to the first aspect.

According to the method and apparatus for detecting ground point cloud points in some embodiments of the present disclosure, a segmentation plane and a ground are determined first based on a point cloud collected by a lidar; then the point cloud is segmented into a first sub point cloud and a second sub point cloud based on the segmentation plane; and finally, point cloud points whose distances from the ground are smaller than a first distance threshold in the first sub point cloud are determined as ground point cloud points, and point cloud points whose distances from the ground are smaller than a second distance threshold in the second sub point cloud are determined as the ground point cloud points. The point cloud closer to the lidar is denser, and the threshold for determining the ground point cloud points is lower; the point cloud farther from the lidar is sparser, and the threshold for determining the ground point cloud points is higher. Based on the stepped thresholds of the distances between the point cloud points and the lidar for the ground point cloud points, the accuracy of detection of the ground point cloud points is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
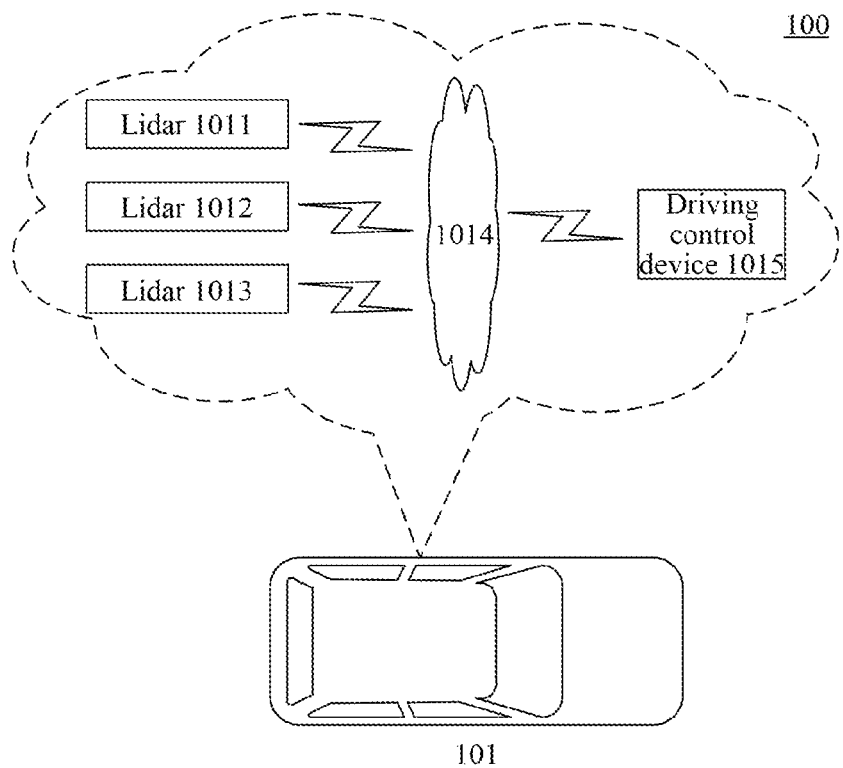
FIG. 1 is an example system architecture in which embodiments of the present disclosure may be implemented.

FIG. 1 shows an example system architecture 100 in which a method for detecting ground point cloud points or an apparatus for detecting ground point cloud points according to embodiments of the present disclosure may be implemented.

As shown in FIG. 1, the system architecture 100 may include an autonomous vehicle 101. The autonomous vehicle 101 may be mounted with a lidar 1011, 1012 or 1013, a network 1014, and a driving control device 1015. The network 1014 serves as a medium providing a communication link between the lidar 1011, 1012 or 1013 and the driving control device 1015. The network 1014 may include various types of connections, such as wired or wireless communication links, or optical fiber cables.

The lidar 1011, 1012 or 1013 may interact with the driving control device 1015 through the network 1014 to receive or send messages, or the like.

The lidar 1011, 1012 or 1013 may be a radar system for detecting the characteristics such as position and velocity of a target by emitting a laser beam. Specifically, when the laser beam emitted by the lidar 1011, 1012 or 1013 is irradiated to the surface of the target, the reflected laser carries information such as orientation and distance. If the laser beam emitted by the lidar 1011, 1012 or 1013 performs scanning according to a certain trajectory, the reflected laser point information is recorded while scanning. Due to the extremely fine scanning, a large number of laser points can be obtained to form a point cloud.

The driving control device 1015, also called an on-board controller, is used for intelligent control on the autonomous vehicle 101. The driving control device 1015 may be a separate controller, such as a programmable logic controller, a single-chip computer, an industrial control computer, or the like; or a device composed of other electronic devices provided with input/output ports and having computing and control functions; or a computer device installed with a vehicle driving control application.

It should be noted that the method for detecting ground point cloud points according to some embodiments of the present disclosure is generally executed by the driving control device 1015. Accordingly, the apparatus for detecting ground point cloud points is provided in the driving control device 1015.

It should be appreciated that the numbers of the driving control device, the network and the lidars in FIG. 1 are merely illustrative. Any number of driving control devices, networks and lidars may be provided based on actual requirements.

Figure 2:
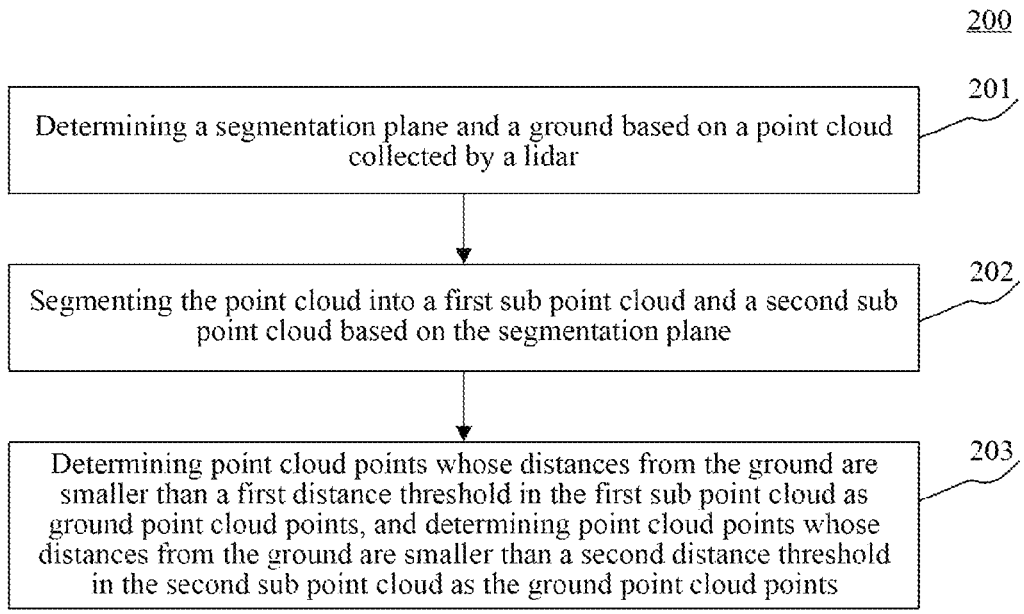
FIG. 2 is a flowchart of a method for detecting ground point cloud points according to an embodiment of the present disclosure.

Further referring to FIG. 2, a flow 200 of a method for detecting ground point cloud points according to an embodiment of the present disclosure is shown. The method for detecting ground point cloud points includes following steps.

Step 201: determining a segmentation plane and a ground based on a point cloud collected by a lidar.

In the present embodiment, the executing body (for example, the driving control device 1015 shown in FIG. 1) of the method for detecting ground point cloud points may receive the point cloud collected by the lidar (for example, the lidar 1011, 1012 or 1013 shown in FIG. 1), and determine the segmentation plane and the ground based on the point cloud.

In practice, the lidar may be mounted on the roof of an autonomous vehicle (for example, the autonomous vehicle 101 shown in FIG. 1) to collect a point cloud of an object around the autonomous vehicle. When the point cloud is collected, the lidar sends the collected point cloud in real time to the executing body. The point cloud collected by the lidar may be composed of a large number of point cloud points (laser points), and each point cloud point may include three-dimensional coordinates and a laser reflection intensity. Here, a coordinate system is usually preselected, and the three-dimensional coordinates of the point cloud points in the point cloud collected by the lidar are all coordinates in the preselected coordinate system. The preselected coordinate system may be, for example, a vehicle coordinate system, an IMU (Inertial measurement unit) coordinate system, or the like.

Here, the segmentation plane may be used to segment the point cloud. For different types of autonomous vehicles and lidars with different numbers of beams, the position of the segmentation plane is different. For example, for a MicroCar mounted with a 16-channel lidar, the segmentation plane is approximately 3 meters away from the lidar. In fact, the position of the segmentation plane is related to the density of point cloud points in the point cloud. The density of point cloud points is related to the distances between the point cloud points and the lidar. Generally, the point cloud points closer to the lidar are denser; and the point cloud points farther from the lidar are sparser. Alternatively, the executing body may first determine the density of point cloud points in the point cloud; then generate a corresponding relationship between the density of point cloud points in the point cloud and the distance from the lidar; and finally, query the corresponding relationship based on a preset segmentation density to obtain the segmentation plane. Generally, the methods for determining the density of point cloud points may include the following two methods. First, for the point cloud points of the same beam in the point cloud, the executing body may first calculate a distance between adjacent point cloud points; and then determine the density of point cloud points of the beam based on the distance between the adjacent point cloud points. Generally, if the interval between the adjacent point cloud points of the same beam is smaller, the point cloud points at the position are denser; and if the interval between the adjacent point cloud points of the same beam is larger, the point cloud points at the position are sparser. It should be understood that this method can be applied to determine the density of point cloud points in the point cloud collected by the lidar with an arbitrary number of beams. Second, the executing body may first calculate a distance between point cloud points of adjacent beams in the point cloud; and then determine the density of point cloud points of the adjacent beams based on the distance between the adjacent beams. Generally, if the angle of the adjacent beams is smaller, the point cloud points of the adjacent beams are denser; and if the angle of the adjacent beams is larger, the point cloud points of the adjacent beams are sparser. It should be understood that this method can only be applied to determine the density of point cloud points in the point cloud collected by the lidar including at least two beams.

Here, most of the laser beams emitted by the lidar mounted on the autonomous vehicle are irradiated to the ground. The ground is generally determined by the point cloud points having a higher probability of belonging to the ground in the point cloud. For example, the executing body may first draw a distribution histogram of the point cloud by taking the height interval as the horizontal ordinate and the number of point cloud points as the longitudinal coordinate; and then fit the ground based on the point cloud points falling into a peak interval of the distribution histogram in the point cloud. The height of a point cloud point in the point cloud may be equal to the value of a Z coordinate in the three-dimensional coordinates of the point cloud point. Here, the executing body may divide the height into multiple fine-grained intervals. For example, the height intervals may include 0 to 0.1 m, 0.1 to 0.2 m, 0.2 to 0.3 m, and the like. Subsequently, the executing body may count the number of point cloud points falling into each height interval, and draw the distribution histogram of the point cloud. Finally, the executing body may determine the peak interval of the distribution histogram, and fit a plane as the ground by using at least part of the point cloud points falling into the peak interval. Generally, the distribution histogram may be normally distributed. That is, the number of point cloud points falling into the peak interval of the distribution histogram is significantly larger than the number of point cloud points falling into other intervals.

Step 202: segmenting the point cloud into a first sub point cloud and a second sub point cloud based on the segmentation plane.

In the present embodiment, the executing body may segment the point cloud into the first sub point cloud and the second sub point cloud based on the segmentation plane. Generally, the first sub point cloud is between the segmentation plane and the lidar, and is closer to the lidar. The second sub point cloud is on the other side of the segmentation plane, and is farther from the lidar. That is, the distances between the point cloud points of the first sub point cloud and the lidar are shorter than the distance between the segmentation plane and the lidar. The distances between the point cloud points of the second sub point cloud and the lidar are not shorter than the distance between the segmentation plane and the lidar.

Step 203: determining point cloud points whose distances from the ground are smaller than a first distance threshold in the first sub point cloud as ground point cloud points, and determining point cloud points whose distances from the ground are smaller than a second distance threshold in the second sub point cloud as the ground point cloud points.

In the present embodiment, the executing body may determine the point cloud points whose distances from the ground are smaller than the first distance threshold (for example, 0.1 m) in the first sub point cloud as ground point cloud points, and determine the point cloud points whose distances from the ground are smaller than the second distance threshold (for example, 0.3 m) in the second sub point cloud as ground point cloud points. Because the first sub point cloud is closer to the lidar and its point cloud points are denser, while the second sub point cloud is farther from the lidar and its point cloud points are sparser, the first distance threshold is generally smaller than the second distance threshold.

In some alternative implementations of the present embodiment, the executing body may filter the ground point cloud points in the point cloud, and detect obstacles based on the filtered point cloud. In this way, the probability of detecting the ground as an obstacle by mistake is effectively reduced.

According to the method for detecting ground point cloud points in some embodiments of the present disclosure, a segmentation plane and a ground are determined first based on a point cloud collected by a lidar; then the point cloud is segmented into a first sub point cloud and a second sub point cloud based on the segmentation plane; and finally, point cloud points whose distances from the ground are smaller than a first distance threshold in the first sub point cloud are determined as ground point cloud points, and point cloud points whose distances from the ground are smaller than a second distance threshold in the second sub point cloud are determined as ground point cloud points. The point cloud closer to the lidar is denser, and the threshold for determining ground point cloud points is lower; the point cloud farther from the lidar is sparser, and the threshold for determining ground point cloud points is higher. Based on the stepped thresholds of the distances between the point cloud points and the lidar for the ground point cloud points, the accuracy of detection of the ground point cloud points is improved.

Figure 3:
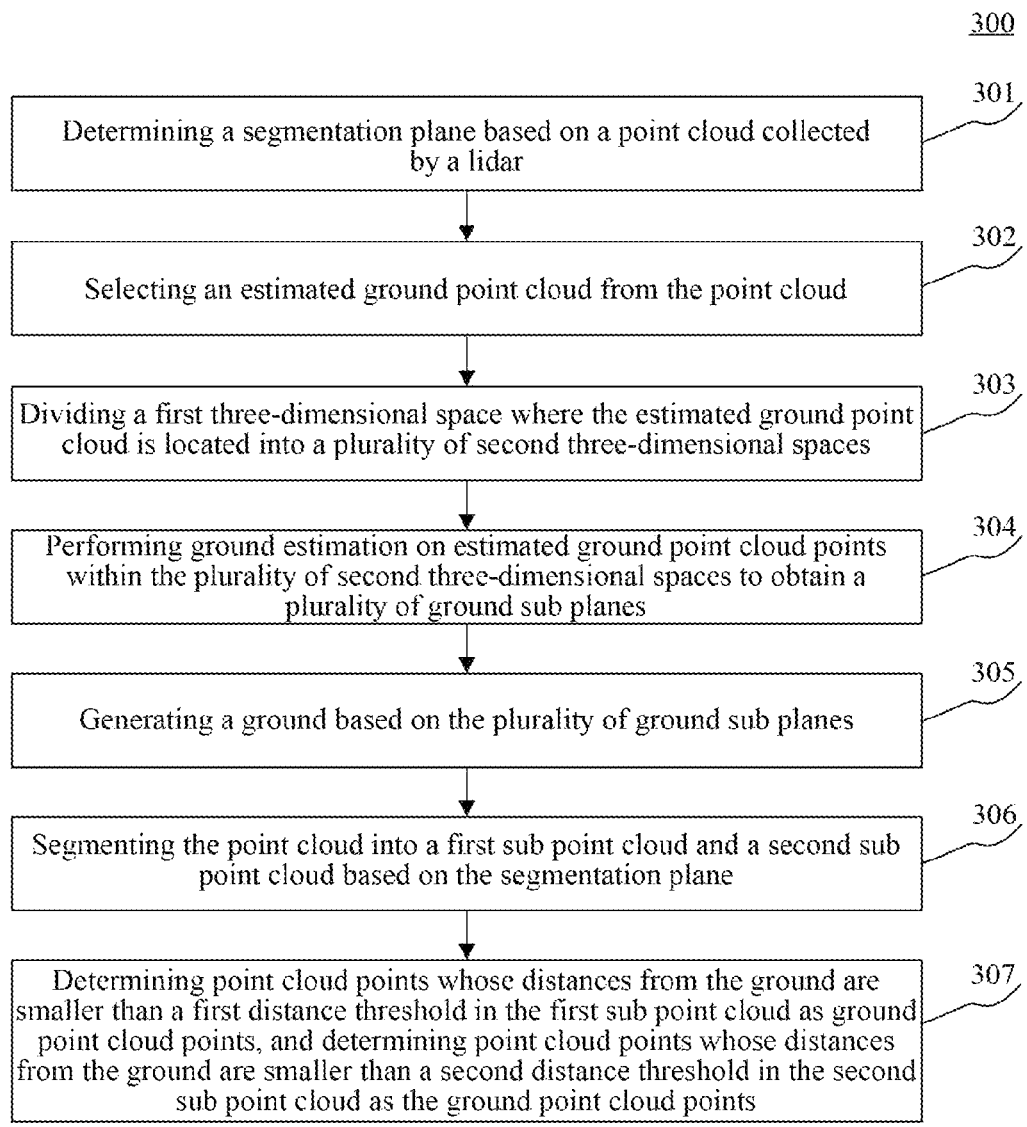
FIG. 3 is a flowchart of the method for detecting ground point cloud points according to another embodiment of the present disclosure.

Further referring to FIG. 3, a flow 300 of the method for detecting ground point cloud points according to another embodiment of the present disclosure is shown. The method for detecting ground point cloud points includes following steps.

Step 301: determining a segmentation plane based on a point cloud collected by a lidar.

In the present embodiment, the specific operation of step 301 has been described in detail in step 201 of embodiments shown in FIG. 2, and details are not described herein again.

Step 302: selecting an estimated ground point cloud from the point cloud.

In the present embodiment, the executing body (for example, the driving control device 1015 shown in FIG. 1) of the method for estimating a ground may select the estimated ground point cloud from the point cloud collected by the lidar.

Generally, the estimated ground point cloud may be at least part of the point cloud collected by the lidar, and is composed of point cloud points having a high probability of belonging to the ground in the point cloud collected by the lidar.

In some alternative implementations of the present embodiment, most of the laser beams emitted by lidar mounted on the autonomous vehicle are irradiated to the ground. That is, a large part of point cloud points in the point cloud collected by the lidar belong to the ground. Therefore, the executing body can directly use the point cloud collected by the lidar as the estimated ground point cloud for subsequent ground estimation.

In some alternative implementations of the present embodiment, the ground is not completely flat, and the ground point cloud points are not completely on the same plane, so the selected estimated ground point cloud should also be three-dimensional. Specifically, the executing body may select point cloud points within a preset height range from an estimated ground from the point cloud collected by the lidar to obtain the estimated ground point cloud. The estimated ground may be an estimated plane close to the ground. For example, the estimated ground may be a plane determined by four contact points between the wheels of the autonomous vehicle and the ground. Specifically, the executing body may first determine the point cloud points above the estimated ground and not greater than a first height threshold (for example, 50 cm) from the estimated ground in the point cloud collected by the lidar as estimated ground point cloud points, and determine the point cloud points below the estimated ground and not greater than a second height threshold (for example, 30 cm) from the estimated ground as estimated ground point cloud points; and then form the estimated ground point cloud based on the determined estimated ground point cloud points. It should be understood that, in an actual scenario, a large part of point cloud points in the point cloud collected by the lidar are above the estimated ground, so the second height threshold is generally not greater than the first height threshold.

Step 303: dividing a first three-dimensional space where the estimated ground point cloud is located into a plurality of second three-dimensional spaces.

In the present embodiment, the executing body may divide the first three-dimensional space where the estimated ground point cloud is located into the plurality of second three-dimensional spaces. Generally, the first three-dimensional space where the estimated ground point cloud is located is a cube surrounding the estimated ground point cloud. Here, the cube surrounding the estimated ground point cloud is divided into a plurality of small cubes, and each small cube is a second three-dimensional space.

In some alternative implementations of the present embodiment, the executing body may first divide the estimated ground into a plurality of grids (for example, 64 grids of 8×8); and then segment the first three-dimensional space based on the plurality of grids to obtain the plurality of second three-dimensional spaces. It should be understood that the executing body only divides the region of the estimated ground within the detection range of the lidar into the grids, and then divides the first three-dimensional space into a plurality of small three-dimensional spaces (i.e., second three-dimensional spaces) by using the grids.

Step 304: performing ground estimation on estimated ground point cloud points within the plurality of second three-dimensional spaces to obtain a plurality of ground sub planes.

In the present embodiment, for each second three-dimensional space, the executing body may perform ground estimation on the estimated ground point cloud points in the second three-dimensional space to obtain a ground sub plane. Specifically, the executing body may select at least part of the estimated ground point cloud points in the second three-dimensional space to fit a plane, and use the fitted plane as the ground sub plane.

Step 305: generating a ground based on the plurality of ground sub planes.

In the present embodiment, the executing body may generate the ground based on the plurality of ground sub planes. For example, the executing body may connect adjacent ground sub planes among the plurality of ground sub planes to generate the ground.

In some alternative implementations of the present embodiment, the executing body may smooth the plurality of ground sub planes to generate the ground. Alternatively, for each ground sub plane, the executing body may smooth the ground sub plane by using a ground sub plane adjacent to the ground sub plane. For example, the executing body may first calculate a weighted average of the angle of the ground sub plane and the angle of the adjacent ground sub plane; and then adjust the angle of the ground sub plane based on the weighted average. For each ground sub plane, the weight of the angle of the ground sub plane is generally greater than the weight of the angle of the adjacent ground sub plane. At this time, the calculated weighted average is generally smaller than the angle of the ground sub plane. By adjusting the angle of the ground sub plane using the weighted average, the obtuse angle between the ground sub plane and its adjacent ground sub plane may be larger, that is, the transition between the ground sub plane and its adjacent ground sub plane is smoother. In addition, since each ground sub plane is local information, and the ground sub plane is smoothed by using the adjacent ground sub plane, global information can be added to the ground sub plane, and the obtained ground can be smoother and more realistic.

Step 306: segmenting the point cloud into a first sub point cloud and a second sub point cloud based on the segmentation plane.

Step 307: determining point cloud points whose distances from the ground are smaller than a first distance threshold in the first sub point cloud as ground point cloud points, and determining point cloud points whose distances from the ground are smaller than a second distance threshold in the second sub point cloud as the ground point cloud points.

In the present embodiment, the specific operations of steps 306 and 307 have been described in detail in steps 202 and 203 in embodiments shown in FIG. 2, and details are not described herein again.

It can be seen from FIG. 3 that, compared with the corresponding embodiment of FIG. 2, the flow 300 of the method for detecting ground point cloud points in the present embodiment highlights the step of estimating the ground. According to the solution described in the present embodiment, ground estimation is performed respectively after the estimated ground point cloud is divided, which improves the reality of the estimated ground.

Figure 4:
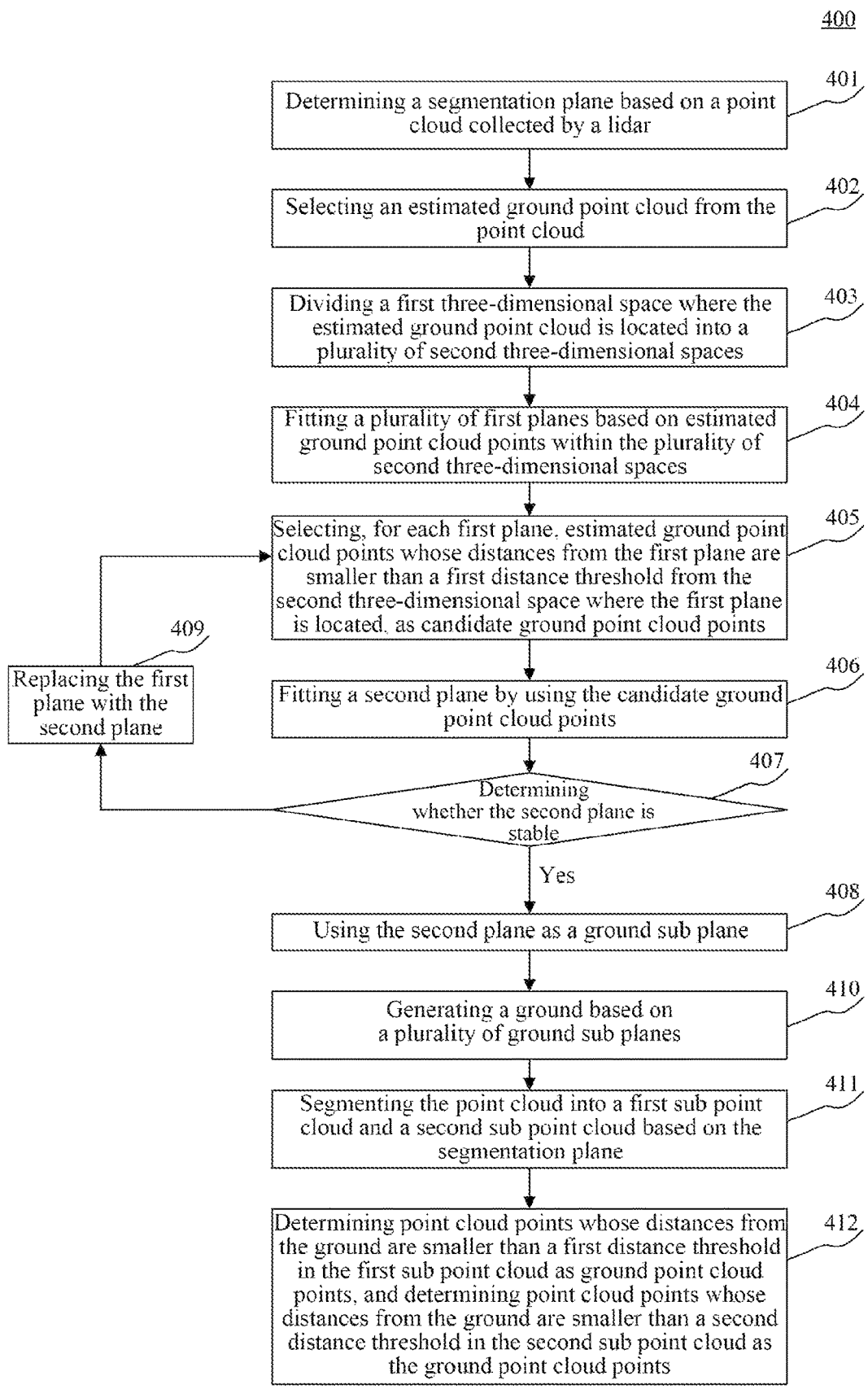
FIG. 4 is a flowchart of the method for detecting ground point cloud points according to another embodiment of the present disclosure.

Further referring to FIG. 4, a flow 400 of the method for detecting ground point cloud points according to another embodiment of the present disclosure is shown. The method for detecting ground point cloud points includes following steps.

Step 401: determining a segmentation plane based on a point cloud collected by a lidar.

Step 402: selecting an estimated ground point cloud from the point cloud.

Step 403: dividing a first three-dimensional space where the estimated ground point cloud is located into a plurality of second three-dimensional spaces.

In the present embodiment, the specific operations of steps 401-403 have been described in detail in steps 301-303 in embodiments shown in FIG. 3, and details are not described herein again.

Step 404: fitting a plurality of first planes based on estimated ground point cloud points within the plurality of second three-dimensional spaces.

In the present embodiment, for each second three-dimensional space, the executing body (for example, the driving control device 1015 shown in FIG. 1) of the method for estimating a ground may fit a first plane based on the estimated ground point cloud points within the second three-dimensional space. Specifically, the executing body may select at least part of the estimated ground point cloud points within the second three-dimensional space to fit the first plane.

In some alternative implementations of the present embodiment, for each second three-dimensional space, the executing body may first sample the estimated ground point cloud points within the second three-dimensional space to obtain sampled ground point cloud points; and then fit the first plane by using the sampled ground point cloud points. Alternatively, the executing body may randomly sample the estimated ground point cloud points within the second three-dimensional space. Here, sampling first and then fitting effectively reduce the calculation amount in fitting the plane.

In some alternative implementations of the present embodiment, the executing body may first divide the second three-dimensional space into a plurality of third three-dimensional spaces; and then sample the estimated ground point cloud points within each third three-dimensional space. Alternatively, the executing body may randomly sample the estimated ground point cloud points within each third three-dimensional space. In this way, first division of the small three-dimensional spaces and then sampling of each small three-dimensional space ensure that the sampled point cloud points are uniformly distributed within the entire second three-dimensional space.

Step 405: selecting, for each first plane, estimated ground point cloud points whose distances from the first plane are smaller than a first distance threshold from the second three-dimensional space where the first plane is located, as candidate ground point cloud points.

In the present embodiment, for each first plane, the executing body may calculate the distance of each estimated ground point cloud point within the second three-dimensional space where the first plane is located from the first plane, and select the estimated ground point cloud points whose distances from the first plane are smaller than the first distance threshold as the candidate ground point cloud points. The estimated ground point cloud points whose distances from the first plane are smaller than the first distance threshold may be considered as point cloud points on the first plane. The estimated ground point cloud points whose distances from the first plane are not smaller than the first distance threshold may be considered as point cloud points not on the first plane.

Step 406: fitting a second plane by using the candidate ground point cloud points.

In the present embodiment, the executing body may fit the second plane by using the candidate ground point cloud points selected from the second three-dimensional space where the first plane is located.

Step 407: determining whether the second plane is stable.

In the present embodiment, the executing body may determine whether the second plane is stable; if the second plane is stable, step 408 is performed; and if the second plane is unstable, step 409 is performed. Generally, when the second plane satisfies certain condition, it is determined that the second plane is stable.

In some alternative implementations of the present embodiment, if the number of performing the fitting steps is smaller than a number threshold (for example, 3), the executing body may determine whether the sum of the distances from the estimated ground point cloud points within the second three-dimensional space to the second plane is smaller than a second distance threshold; if smaller than the second distance threshold, it is determined that the second plane is stable; if not smaller than the second distance threshold, it is determined that the second plane is unstable. In addition, if the number of performing the fitting steps is not smaller than the number threshold, or the number of performing the fitting steps is not smaller than the number threshold and the angle of the second plane is greater than an angle threshold (for example, 6 degrees), the executing body may determine that no ground point cloud point exists within the second three-dimensional space. The fitting steps may include steps 405-409.

Step 408: using the second plane as a ground sub plane.

In the present embodiment, when the second plane is stable, the executing body may use the second plane as the ground sub plane.

Step 409: replacing the first plane with the second plane.

In the present embodiment, when the second plane is unstable, the executing body may replace the first plane with the second plane, and continue to perform step 405.

Step 410: generating a ground based on a plurality of ground sub planes.

Step 411: segmenting the point cloud into a first sub point cloud and a second sub point cloud based on the segmentation plane.

Step 412: determining point cloud points whose distances from the ground are smaller than a first distance threshold in the first sub point cloud as ground point cloud points, and determining point cloud points whose distances from the ground are smaller than a second distance threshold in the second sub point cloud as the ground point cloud points.

In the present embodiment, the specific operations of steps 410-412 have been described in detail in steps 305-307 in embodiments shown in FIG. 3, and details are not described herein again.

It can be seen from FIG. 4 that, compared with the corresponding embodiment of FIG. 3, the flow 400 of the method for detecting ground point cloud points in the present embodiment highlights the step of iteratively calculating the planes. According to the solution described in the present embodiment, the second planes are calculated through multiple iterations, so that the second planes are closer to the real ground, which further improves the reality of the estimated ground.

Figure 5:
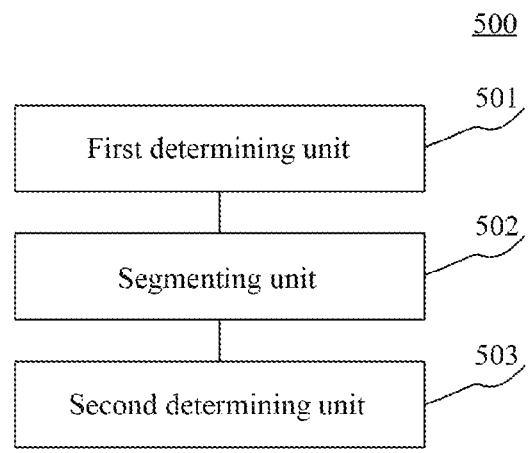
FIG. 5 is a schematic structural diagram of an apparatus for detecting ground point cloud points according to an embodiment of the present disclosure.

Further referring to FIG. 5, as an implementation of the method shown in the above figures, the present disclosure provides an embodiment of an apparatus for detecting ground point cloud points. An embodiment of the apparatus may correspond to an embodiment of the method shown in FIG. 2, and the apparatus may be applied to various electronic devices.

As shown in FIG. 5, the apparatus 500 for detecting ground point cloud points according to the present embodiment may include a first determining unit 501, a segmenting unit 502, and a second determining unit 503. The first determining unit 501 is configured to determine a segmentation plane and a ground based on a point cloud collected by a lidar; the segmenting unit 502 is configured to segment the point cloud into a first sub point cloud and a second sub point cloud based on the segmentation plane, where the distances between point cloud points of the first sub point cloud and the lidar are shorter than the distance between the segmentation plane and the lidar, and the distances between point cloud points of the second sub point cloud and the lidar are not shorter than the distance between the segmentation plane and the lidar; and the second determining unit 503 is configured to determine the point cloud points whose distances from the ground are smaller than a first distance threshold in the first sub point cloud as ground point cloud points, and determine the point cloud points whose distances from the ground are smaller than a second distance threshold in the second sub point cloud as the ground point cloud points, where the first distance threshold is smaller than the second distance threshold.

In the present embodiment, the specific processing of the first determining unit 501, the segmenting unit 502, and the second determining unit 503 of the apparatus 500 for detecting ground point cloud points and the technical effects thereof may be referred to the related description in steps 201-203 in the corresponding embodiment of FIG. 2, respectively, and details are not described herein again.

In some alternative implementations of the present embodiment, the first determining unit 501 includes: a determining subunit (not shown), configured to determine a density of point cloud points in the point cloud; a first generating subunit (not shown), configured to generate a corresponding relationship between the density of point cloud points in the point cloud and a distance of the point cloud from the lidar; and a query subunit (not shown), configured to query the corresponding relationship based on a preset segmentation density to obtain the segmentation plane.

In some alternative implementations of the present embodiment, the determining subunit is further configured to: calculate, for the point cloud points of the same beam in the point cloud, a distance between adjacent point cloud points; and determine the density of point cloud points of the beam based on the distance between the adjacent point cloud points.

In some alternative implementations of the present embodiment, the determining subunit is further configured to: calculate, in response to determining that the point cloud includes point cloud points of at least two beams, a distance between point cloud points of adjacent beams in the point cloud; and determine the density of point cloud points of the adjacent beams based on the distance between the point cloud points of the adjacent beams.

In some alternative implementations of the present embodiment, the first determining unit 501 includes: a drawing subunit (not shown), configured to draw a distribution histogram of the point cloud by taking a height interval as a horizontal ordinate and a number of point cloud points as a longitudinal coordinate; and a fitting subunit (not shown), configured to fit the ground based on the point cloud points falling into a peak interval of the distribution histogram.

In some alternative implementations of the present embodiment, the first determining unit 501 includes: a selecting a subunit (not shown), configured to select an estimated ground point cloud from the point cloud; a dividing subunit (not shown), configured to divide a first three-dimensional space where the estimated ground point cloud is located into a plurality of second three-dimensional spaces; an estimating subunit (not shown), configured to perform ground estimation on estimated ground point cloud points within the plurality of second three-dimensional spaces to obtain a plurality of ground sub planes; and a second generation subunit (not shown), configured to generate the ground based on the plurality of ground sub planes.

In some alternative implementations of the present embodiment, the estimating subunit includes: a first fitting module (not shown), configured to fit a plurality of first planes based on the estimated ground point cloud points within the plurality of second three-dimensional spaces; and a second fitting module (not shown), configured to perform following fitting steps for each first plane: selecting estimated ground point cloud points whose distances from the first plane are smaller than the first distance threshold from the second three-dimensional space where the first plane is located, as candidate ground point cloud points; fitting a second plane by using the candidate ground point cloud points; determining whether the second plane is stable; and using the second plane as the ground sub plane in response to determining that the second plane is stable.

In some alternative implementations of the present embodiment, the estimating subunit further includes: a replacing module (not shown), configured to replace, in response to determining that the second plane is unstable, the first plane with the second plane, and continue to perform the fitting steps.

In some alternative implementations of the present embodiment, the second fitting subunit is further configured to: determine, in response to determining that a number of performing the fitting steps is smaller than a number threshold, whether a sum of distances from the estimated ground point cloud points within the second three-dimensional space to the second plane is smaller than the second distance threshold; determine, in response to determining that the sum of the distances from the estimated ground point cloud points within the second three-dimensional space to the second plane is smaller than the second distance threshold, that the second plane is stable; and determine, in response to determining that the sum of the distances from the estimated ground point cloud points within the second three-dimensional space to the second plane is not smaller than the second distance threshold, that the second plane is unstable.

In some alternative implementations of the present embodiment, the second generating subunit is further configured to: calculate, for each ground sub plane, a weighted average of an angle of the ground sub plane and an angle of an adjacent ground sub plane; and adjust the angle of the ground sub plane based on the weighted average.

Hereinafter, referring to FIG. 6, a schematic structural diagram of a computer system 600 adapted to implement an electronic device (for example, the driving control device 1015 shown in FIG. 1) of some embodiments of the present disclosure is shown. The electronic device shown in FIG. 6 is just an example, which does not impose any restrictions on the functions and scope of application of the present embodiments of the present disclosure.

Figure 6:
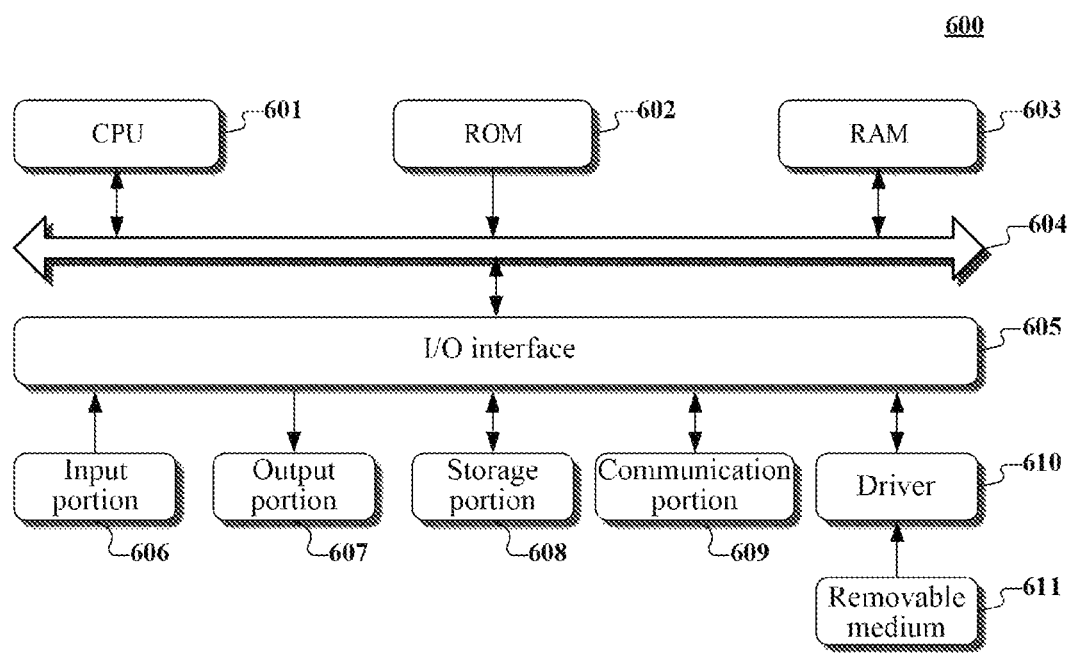
FIG. 6 is a schematic structural diagram of a computer system adapted to implement an electronic device of some embodiments of the present disclosure.

As shown in FIG. 6, the computer system 600 includes a central processing unit (CPU) 601, which can execute various appropriate operations and processes based on programs stored in a read-only memory (ROM) 602 or programs loaded from a storage portion 608 to a random access memory (RAM) 603. The RAM 603 also stores various programs and data required by operations of the system 600. The CPU 601, the ROM 602, and the RAM 603 are connected to each other by a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display (LCD), a speaker, or the like; a storage portion 608 including a hard disk or the like; and a communication portion 609 including a network interface card, such as an LAN card and a modem. The communication portion 609 performs communication processes via a network, such as the Internet. A driver 610 is also connected to the I/O interface 605 as required. A removable medium 611 such as a magnetic disk, an optical disk, a magneto-optical disk or a semiconductor memory is installed on the driver 610 as needed, so that a computer program read therefrom is installed in the storage portion 608 as needed.

In particular, according to some embodiments disclosed by the present disclosure, a process described above by referring to the flow diagrams can be implemented as a computer software program. For example, an embodiment of the present disclosure includes a computer program product including a computer program loaded to a computer-readable medium, the computer program including a program code for executing the method shown in the flowchart. In such an embodiment, the computer program may be downloaded and installed from a network via the communication portion 609, and/or installed from the removable medium 611. When the computer program is executed by the CPU 601, the functions defined in the method of some embodiments of the present disclosure are executed.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. Amore specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by means of software or hardware. The described units may also be provided in a processor, for example, described as: a processor, including a first determining unit, a segmenting unit, and a second determining unit. Here, the names of these units do not in some cases constitute limitations to such units themselves. For example, the first determining unit may also be described as "a unit configured to determine a segmentation plane and a ground based on a point cloud collected by a lidar."

In another aspect, the present disclosure further provides a computer-readable medium. The computer-readable medium may be included in the electronic device described in the above described embodiments, or a stand-alone computer-readable medium not assembled into the electronic device. The computer-readable medium stores one or more programs. The one or more programs, when executed by the electronic device, cause the electronic device to: determine a segmentation plane and a ground based on a point cloud collected by a lidar; segment the point cloud into a first sub point cloud and a second sub point cloud based on the segmentation plane, where the distances between point cloud points of the first sub point cloud and the lidar are shorter than the distance between the segmentation plane and the lidar, and the distances between point cloud points of the second sub point cloud and the lidar are not shorter than the distance between the segmentation plane and the lidar; and determine the point cloud points whose distances from the ground are smaller than a first distance threshold in the first sub point cloud as ground point cloud points, and determine the point cloud points whose distances from the ground are smaller than a second distance threshold in the second sub point cloud as the ground point cloud points, where the first distance threshold is smaller than the second distance threshold.

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for detecting ground point cloud points, comprising:
    selecting an estimated ground point cloud from a point cloud collected by a lidar;
    dividing a three-dimensional space where the estimated ground point cloud is located, to obtain a segmentation plane, and determining a ground by judging a plane in the divided three-dimensional space based on a first distance threshold;
    segmenting the point cloud into a first sub point cloud and a second sub point cloud based on the segmentation plane, distances between point cloud points of the first sub point cloud and the lidar being shorter than a distance between the segmentation plane and the lidar, and distances between point cloud points of the second sub point cloud and the lidar being not shorter than the distance between the segmentation plane and the lidar; and
    determining the point cloud points whose distances from the ground are smaller than the first distance threshold in the first sub point cloud as ground point cloud points, and determining the point cloud points whose distances from the ground are smaller than a second distance threshold in the second sub point cloud as the ground point cloud points, the first distance threshold being smaller than the second distance threshold.

2. The method according to claim 1, wherein the dividing a three-dimensional space where the estimated ground point cloud is located, to obtain a segmentation plane comprises:
    determining a density of point cloud points in the point cloud;
    generating a corresponding relationship between the density of point cloud points in the point cloud and a distance of the point cloud from the lidar; and
    querying the corresponding relationship based on a preset segmentation density to obtain the segmentation plane.

3. The method according to claim 2, wherein the determining the density of point cloud points in the point cloud comprises:
    calculating, for the point cloud points of the same beam in the point cloud, a distance between adjacent point cloud points; and
    determining the density of point cloud points of the beam based on the distance between the adjacent point cloud points.

4. The method according to claim 2, wherein the determining the density of point cloud points in the point cloud comprises:
    calculating, in response to determining that the point cloud comprises point cloud points of at least two beams, a distance between point cloud points of adjacent beams in the point cloud; and
    determining the density of point cloud points of the adjacent beams based on the distance between the point cloud points of the adjacent beams.

5. The method according to claim 1, wherein the determining a ground by judging a plane in the divided three-dimensional space based on a first distance threshold comprises:
    drawing a distribution histogram of the point cloud by taking a height interval as a horizontal ordinate and a number of point cloud points as a longitudinal coordinate; and
    fitting the ground based on the point cloud points falling into a peak interval of the distribution histogram.

6. The method according to claim 1, wherein the dividing a three-dimensional space where the estimated ground point cloud is located, to obtain a segmentation plane, and determining a ground by judging a plane in the divided three-dimensional space based on a first distance threshold comprises:
    dividing a first three-dimensional space where the estimated ground point cloud is located into a plurality of second three-dimensional spaces;
    performing ground estimation on estimated ground point cloud points within the plurality of second three-dimensional spaces to obtain a plurality of ground sub planes; and
    generating the ground based on the plurality of ground sub planes.

7. The method according to claim 6, wherein the performing ground estimation on estimated ground point cloud points within the plurality of second three-dimensional spaces to obtain a plurality of ground sub planes comprises:
fitting a plurality of first planes based on the estimated ground point cloud points within the plurality of second three-dimensional spaces; and
performing following fitting steps for each first plane: selecting estimated ground point cloud points whose distances from the first plane are smaller than the first distance threshold from the second three-dimensional space where the first plane is located, as candidate ground point cloud points; fitting a second plane by using the candidate ground point cloud points; determining whether the second plane is stable; and using the second plane as the ground sub plane in response to determining that the second plane is stable.

8. The method according to claim 7, wherein the performing ground estimation on estimated ground point cloud points within the plurality of second three-dimensional spaces to obtain a plurality of ground sub planes further comprises:
replacing, in response to determining that the second plane is unstable, the first plane with the second plane, and continuing to perform the fitting steps.

9. The method according to claim 7, wherein the determining whether the second plane is stable comprises:
determining, in response to determining that a number of performing the fitting steps is smaller than a number threshold, whether a sum of distances from the estimated ground point cloud points within the second three-dimensional space to the second plane is smaller than the second distance threshold;
determining, in response to determining that the sum of the distances from the estimated ground point cloud points within the second three-dimensional space to the second plane is smaller than the second distance threshold, that the second plane is stable; and
determining, in response to determining that the sum of the distances from the estimated ground point cloud points within the second three-dimensional space to the second plane is not smaller than the second distance threshold, that the second plane is unstable.

10. The method according to claim 6, wherein the generating the ground based on the plurality of ground sub planes comprises:
calculating, for each ground sub plane, a weighted average of an angle of the ground sub plane and an angle of an adjacent ground sub plane; and
adjusting the angle of the ground sub plane based on the weighted average.

11. An apparatus for detecting ground point cloud points, comprising:
at least one processor; and
a memory storing instructions, the instructions when executed by the at least one processor, causing the at least one processor to perform operations, the operations comprising:
selecting an estimated ground point cloud from a point cloud collected by a lidar;
dividing a three-dimensional space where the estimated ground point cloud is located, to obtain a segmentation plane, and determining a ground by judging a plane in the divided three-dimensional space based on a first distance threshold;
segmenting the point cloud into a first sub point cloud and a second sub point cloud based on the segmentation plane, distances between point cloud points of the first sub point cloud and the lidar being shorter than a distance between the segmentation plane and the lidar, and distances between point cloud points of the second sub point cloud and the lidar being not shorter than the distance between the segmentation plane and the lidar; and
determining the point cloud points whose distances from the ground are smaller than the first distance threshold in the first sub point cloud as ground point cloud points, and determining the point cloud points whose distances from the ground are smaller than a second distance threshold in the second sub point cloud as the ground point cloud points, the first distance threshold being smaller than the second distance threshold.

12. The apparatus according to claim 11, wherein the dividing a three-dimensional space where the estimated ground point cloud is located, to obtain a segmentation plane comprises:
determining a density of point cloud points in the point cloud;
generating a corresponding relationship between the density of point cloud points in the point cloud and a distance of the point cloud from the lidar; and
querying the corresponding relationship based on a preset segmentation density to obtain the segmentation plane.

13. The apparatus according to claim 12, wherein the determining the density of point cloud points in the point cloud comprises:
calculating, for the point cloud points of the same beam in the point cloud, a distance between adjacent point cloud points; and
determining the density of point cloud points of the beam based on the distance between the adjacent point cloud points.

14. The apparatus according to claim 12, wherein the determining the density of point cloud points in the point cloud comprises:
calculating, in response to determining that the point cloud comprises point cloud points of at least two beams, a distance between point cloud points of adjacent beams in the point cloud; and
determining the density of point cloud points of the adjacent beams based on the distance between the point cloud points of the adjacent beams.

15. The apparatus according to claim 11, wherein the determining a ground by judging a plane in the divided three-dimensional space based on a first distance threshold comprises:
drawing a distribution histogram of the point cloud by taking a height interval as a horizontal ordinate and a number of point cloud points as a longitudinal coordinate; and
fitting the ground based on the point cloud points falling into a peak interval of the distribution histogram.

16. The apparatus according to claim 11, wherein the dividing a three-dimensional space where the estimated ground point cloud is located, to obtain a segmentation plane, and determining a ground by judging a plane in the divided three-dimensional space based on a first distance threshold comprises:
dividing a first three-dimensional space where the estimated ground point cloud is located into a plurality of second three-dimensional spaces;
performing ground estimation on estimated ground point cloud points within the plurality of second three-dimensional spaces to obtain a plurality of ground sub planes; and generating the ground based on the plurality of ground sub planes.

17. The apparatus according to claim 16, wherein the performing ground estimation on estimated ground point cloud points within the plurality of second three-dimensional spaces to obtain a plurality of ground sub planes comprises:
fitting a plurality of first planes based on the estimated ground point cloud points within the plurality of second three-dimensional spaces; and
performing following fitting steps for each first plane: selecting estimated ground point cloud points whose distances from the first plane are smaller than the first distance threshold from the second three-dimensional space where the first plane is located, as candidate ground point cloud points; fitting a second plane by using the candidate ground point cloud points; determining whether the second plane is stable; and using the second plane as the ground sub plane in response to determining that the second plane is stable.

18. The apparatus according to claim 17, wherein the performing ground estimation on estimated ground point cloud points within the plurality of second three-dimensional spaces to obtain a plurality of ground sub planes further comprises:
replacing, in response to determining that the second plane is unstable, the first plane with the second plane, and continuing to perform the fitting steps.

19. The apparatus according to claim 17, wherein the determining whether the second plane is stable comprises:
determining, in response to determining that a number of performing the fitting steps is smaller than a number threshold, whether a sum of distances from the estimated ground point cloud points within the second three-dimensional space to the second plane is smaller than the second distance threshold;
determining, in response to determining that the sum of the distances from the estimated ground point cloud points within the second three-dimensional space to the second plane is smaller than the second distance threshold, that the second plane is stable; and
determining, in response to determining that the sum of the distances from the estimated ground point cloud points within the second three-dimensional space to the second plane is not smaller than the second distance threshold, that the second plane is unstable.

20. A non-transitory computer-readable medium, storing a computer program thereon, wherein the computer program, when executed by a processor, causes the processor to perform operations, the operations comprising:
selecting an estimated ground point cloud from a point cloud collected by a lidar;
dividing a three-dimensional space where the estimated ground point cloud is located, to obtain a segmentation plane, and determining a ground by judging a plane in the divided three-dimensional space based on a first distance threshold;
segmenting the point cloud into a first sub point cloud and a second sub point cloud based on the segmentation plane, distances between point cloud points of the first sub point cloud and the lidar being shorter than a distance between the segmentation plane and the lidar, and distances between point cloud points of the second sub point cloud and the lidar being not shorter than the distance between the segmentation plane and the lidar; and
determining the point cloud points whose distances from the ground are smaller than the first distance threshold in the first sub point cloud as ground point cloud points, and determining the point cloud points whose distances from the ground are smaller than a second distance threshold in the second sub point cloud as the ground point cloud points, the first distance threshold being smaller than the second distance threshold.

* * * * *